US008939801B2

(12) United States Patent
Tong et al.

(10) Patent No.: US 8,939,801 B2
(45) Date of Patent: Jan. 27, 2015

(54) CONNECTOR BETWEEN BATTERY MODULES AND BATTERY SYSTEM COMPRISING THE SAME

(75) Inventors: Zhiwei Tong, Shenzhen (CN); Qing Lai, Shenzhen (CN); Jia Lu, Shenzhen (CN); Jianhua Zhu, Shenzhen (CN)

(73) Assignees: Shenzhen BYD Auto R&D Company Limited, Shenzhen (CN); BYD Company Limited, Shenzhen (CN)

( * ) Notice: Subject to any disclaimer, the term of this patent is extended or adjusted under 35 U.S.C. 154(b) by 147 days.

(21) Appl. No.: 13/555,001

(22) Filed: Jul. 20, 2012

(65) Prior Publication Data

US 2013/0029540 A1    Jan. 31, 2013

(30) Foreign Application Priority Data

Jul. 29, 2011    (CN) ........................ 2011 1 0214063
Jul. 29, 2011    (CN) ...................... 2011 2 0271655 U (51) Int. Cl.
*H01R 4/42*        (2006.01)
*H01M 2/20*        (2006.01)
*H01M 2/10*        (2006.01)
*H01R 11/28*       (2006.01)

(52) U.S. Cl.
CPC ............ *H01M 2/206* (2013.01); *H01M 2/1077* (2013.01); *H01R 11/288* (2013.01)
USPC ....................................... 439/762

(58) Field of Classification Search
USPC ........... 439/762–763, 521–522, 76.2; 429/99, 429/159–160, 206, 120–121
See application file for complete search history.

(56) References Cited

U.S. PATENT DOCUMENTS

| 5,643,693 | A  | * | 7/1997  | Hill et al. ........... 429/121 |
| 5,645,448 | A  | * | 7/1997  | Hill ................... 439/522 |
| 5,766,801 | A  | * | 6/1998  | Inoue et al. .......... 429/99 |
| 7,499,262 | B1 | * | 3/2009  | Darr .................. 361/626 |
| 8,257,848 | B2 | * | 9/2012  | Ijaz et al. ............ 429/56 |
| 8,409,744 | B2 | * | 4/2013  | Ijaz et al. ........... 429/120 |
| 8,597,843 | B2 | * | 12/2013 | Yamamoto et al. ..... 429/434 |

FOREIGN PATENT DOCUMENTS

| CN | 200969367 Y | 10/2007 |
| CN | 201146250 Y | 11/2008 |
| CN | 202178406 U | 3/2012 |
| JP | 2003-132873 | 5/2003 |

* cited by examiner

*Primary Examiner* — Jean F Duverne
(74) *Attorney, Agent, or Firm* — Morgan, Lewis & Bockius LLP (57) ABSTRACT

A connector between battery modules and a battery system comprising the same are provided. The connector between battery modules comprises: first and second connecting pieces (21, 22), the first connecting piece (21) being electrically connected to an output end of a first battery module, the second connecting piece (22) being electrically connected to an output end of a second battery module adjacent to the first battery module, and the first connecting piece (21) and the second connecting piece (22) being electrically connected to each other so as to form an electrically-connected part therebetween; a clamping unit configured to clamp the electrically-connected part; and a support (5), the clamping unit being fixed onto the support (5) so as to support the electrically-connected part between the first connecting piece (21) and the second connecting piece (22).

18 Claims, 7 Drawing Sheets

CONNECTOR BETWEEN BATTERY MODULES AND BATTERY SYSTEM COMPRISING THE SAME

CROSS REFERENCE TO RELATED APPLICATIONS

This application claims priority to and benefit of Chinese Patent Application No. 201110214063.3, filed Jul. 29, 2011 with State Intellectual Property Office, P.R.C. and Chinese Patent Application No. 201120271655.4, filed Jul. 29, 2011 with State Intellectual Property Office, P.R.C., the entire contents of which are incorporated herein by reference.

TECHNICAL FIELD

The present disclosure generally relates to a connector, more particularly, to a connector between battery modules and a battery system comprising the same.

BACKGROUND ART

In an application of a vehicle power battery, a plurality of battery modules generally are connected by connectors so as to satisfy a requirement of power output, and each of the battery modules is formed by a plurality of cells. Therefore, the reliability and safety of the vehicle power battery is affected directly by the connecting reliability between the battery modules.

A conventional connection between the battery modules is mainly achieved by using a metal member with low resistance, such as a copper wire or a copper piece, and screws. However, vibrations with different frequencies may cause the screw to loosen during the vehicle traveling, which may cause interruption of the power supplying. Moreover, after the screw loosening, the copper wire may freely swing in the battery, which may cause short circuit.

An anti-loosening structure is provided to prevent the screw from being loosened. However, because the copper wire has a heavy weight but no fixing structure, the copper wire generates an outward tensile force against the screw, so that the screw will loosen, which may cause short circuit.

A conventional connector of the battery module comprises a metal piece and at least one layer of arch-shaped metal foil, two ends of the metal piece are connected to terminals of adjacent battery modules respectively, and the metal foil is disposed between the two ends of the metal piece. However, the metal foil is easy to break under a large impact force. Moreover, adjacent battery modules share one connector, so that two ends of the connector should be connected to the terminals of the adjacent battery modules respectively, which may decrease the assembling ability of the battery module.

SUMMARY OF THE DISCLOSURE

Embodiments of the present disclosure seek to solve at least one of the problems existing in the prior art to at least some extent.

Embodiments of a first aspect of the present disclosure provide a connector between battery modules, which is high in reliability and easy to assemble.

Embodiments of a second aspect of the present disclosure provide a battery system.

Embodiments of a first aspect of the present disclosure provide a connector between battery modules. The connector between battery modules comprises: first and second connecting pieces, the first connecting piece being electrically connected to an output end of a first battery module, the second connecting piece being electrically connected to an output end of a second battery module adjacent to the first battery module, and the first connecting piece and the second connecting piece being electrically connected to each other so as to form an electrically-connected part therebetween; a clamping unit configured to clamp the electrically-connected part; and a support, the clamping unit being fixed onto the support so as to support the electrically-connected part between the first connecting piece and the second connecting piece.

In some embodiments, the clamping unit comprises: an upper clamping plate; a lower clamping plate; and a fastener, in which the electrically-connected part is clamped between the upper clamping plate and the lower clamping plate, and the upper clamping plate and the lower clamping plate are fastened together by the fastener.

In some embodiments, the fastener comprises a screw.

In some embodiments, each of the first and second connecting pieces comprises: a buffer section having a substantially inverted U shape; an output end connecting section connected to one end of the buffer section and electrically connected to the output end of the battery module; a clamped section connected to the other end of the buffer section, in which the clamped sections of the first and second connecting pieces are electrically connected to each other.

In some embodiments, a top of the buffer section is in the form of arc, and a radius of the arc is 20%-80% of a height of the buffer section.

In some embodiments, the buffer section is connected to the output end connecting section and the clamped section via transition arcs respectively.

In some embodiments, the clamped sections of the first and second connecting pieces are welded together by resistance welding.

In some embodiments, the first connecting piece and/or the second connecting piece are formed by a plurality of superposed metal sheets.

In some embodiments, the electrically-connected part of the first connecting piece and the second connecting piece is covered by an insulation cover.

Embodiments of a second aspect of the present disclosure provide a battery system. The battery system comprises: a plurality of battery modules each having a plurality of cells, each of the cells having a terminal, the plurality of cells of each battery module being connected to each other in series and/or in parallel by the terminals thereof, each of the battery modules having an output end; and a plurality of connectors, each of which being electrically connected to the output ends of adjacent battery modules respectively, in which each connector is the connector according to any one of the embodiments of the first aspect of the present disclosure.

In some embodiments, the battery system further comprises a battery tray comprising a plurality of battery module mounting zones and a plurality of connector zones, the battery module mounting zones and the connector zones are alternately disposed along a predefined direction, the plurality of battery modules are disposed in the plurality of battery module mounting zones respectively, and the plurality of connectors are disposed in the plurality of connector zones respectively.

In some embodiments, the support of each connector comprises a clamping plate fixing part and a support part perpendicular to the clamping plate fixing part, the clamping plate fixing part is connected to the clamping unit, and the support part is fixed onto the battery tray.

In some embodiments, an electrically-connected part of a first connecting piece and a second connecting piece of each connector is covered by an insulation cover.

In some embodiments, drawing plates corresponding to two adjacent battery module mounting zones respectively are disposed in a respective connector zone between the two battery module mounting zones, and two ends of the insulation cover are fixed onto the drawing plates respectively.

According to embodiments of the present disclosure, the electrically-connected part of the first and second connecting pieces are clamped by the upper and lower clamping plates, and then the upper clamping plate and the lower clamping plate are fastened together by the fastener, so that the connection strength and the reliability of the connection between the first and second connecting pieces are improved. Because the upper clamping plate and/or the lower clamping plate are fixed onto the support, the support can reduce the impact force applied to the electrically-connected part when the battery modules are vibrated or impacted by an external force, which may avoid breaking the connector between the batter modules and improve the connection reliability and the anti-impact ability. In addition, one connecting piece is connected to one battery module, and adjacent battery modules are fastened by a fastener, so that the assembling ability of the battery system is improved.

Furthermore, the insulation cover may be disposed over the electrically-connected part of the first connecting piece and the second connecting piece, which may insulate the electrically-connected part of the first connecting piece and the second connecting piece from external devices, and prevent the battery modules from being short circuited. Therefore, the safety of the battery modules may be improved.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

It is to be understood that phraseology and terminology used herein with reference to device or element orientation (such as, for example, terms like "central," "upper," "lower," "front," "rear," and the like) are only used to simplify description of the present disclosure, and do not alone indicate or imply that the device or element referred to must have a particular orientation.

The connector between battery modules according to embodiments of the present disclosure will be described below with reference of FIGS. 1 to 12.

Embodiment 1

Figure 1:
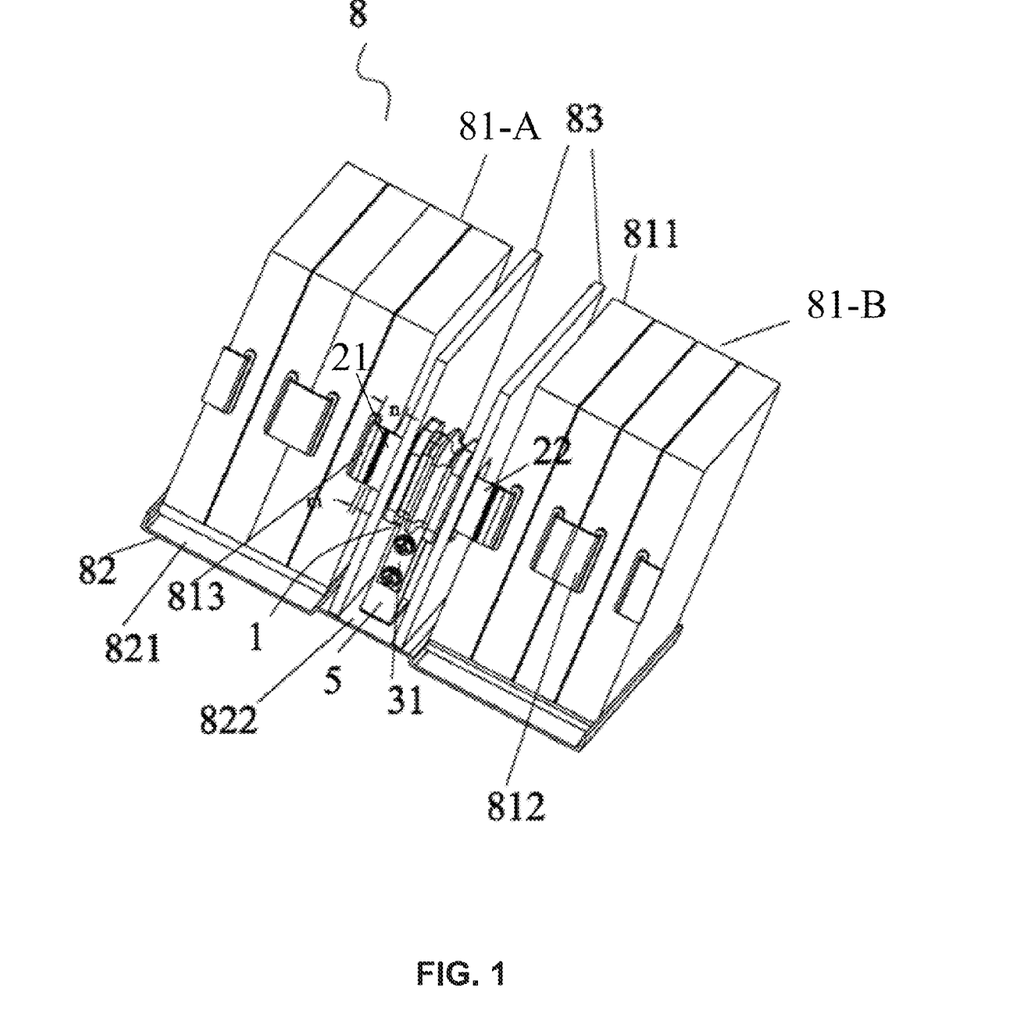
FIG. 1 is a schematic perspective view of a battery system using a connector between battery modules according to an embodiment of the present disclosure.

As shown in FIG. 1, the connector 1 between battery modules 81 according to an embodiment of the present disclosure may comprise first and second connecting pieces 21, 22, a clamping unit and a support 5. The first connecting piece 21 may be electrically connected to an output end of a first battery module (for example, the battery module 81-A on the left in FIG. 1), the second connecting piece 22 may be electrically connected to an output end of a second battery module (for example, the battery module 81-B on the right in FIG. 1), and the first connecting piece 21 and the second connecting piece 22 may be electrically connected to each other so as to form an electrically-connected part therebetween.

The clamping unit clamps the electrically-connected part of the first connecting piece 21 and the second connecting piece 22. The clamping unit may be fixed onto the support 5 so as to support the electrically-connected part of the first connecting piece 21 and the second connecting piece 22.

Figure 2:
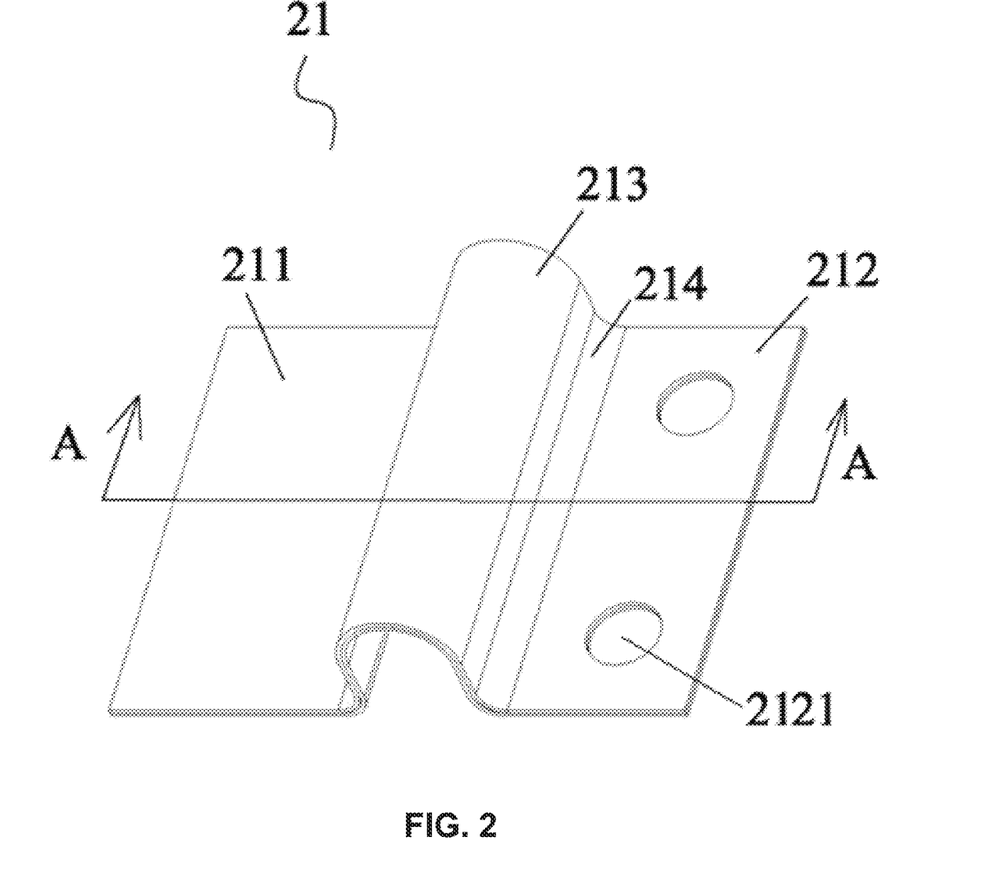
FIG. 2 is a schematic perspective view of a first connecting piece according to an embodiment of the present disclosure.

In this embodiment, the first and second connecting pieces 21, 22 have the same structure, and therefore, in order to describe conveniently, the first connecting pieces 21 will be described as an example. FIG. 2 is a schematic perspective view of the first connecting piece 21 according to an embodiment of the present disclosure. The first connecting piece 21 comprises an output end connecting section 211, a clamped section 212 and a buffer section 213 having a substantially inverted U shape and located between the output end connecting section 211 and the clamped section 212.

The output end connecting section 211 and the clamped section 212 are substantially flat and located at the two opposite sides of the connecting piece 21 respectively. The output end connecting section 211 is connected to one end of the buffer section 213 and electrically connected to the output end of the first battery module, and the clamped section 212 is connected to the other end of the buffer section 213. The first connecting piece 21 is electrically connected to the output end of the battery first module, and the clamped section 212 of the first connecting piece 21 is electrically connected to a clamped section of the second connecting piece 22.

Figure 3:
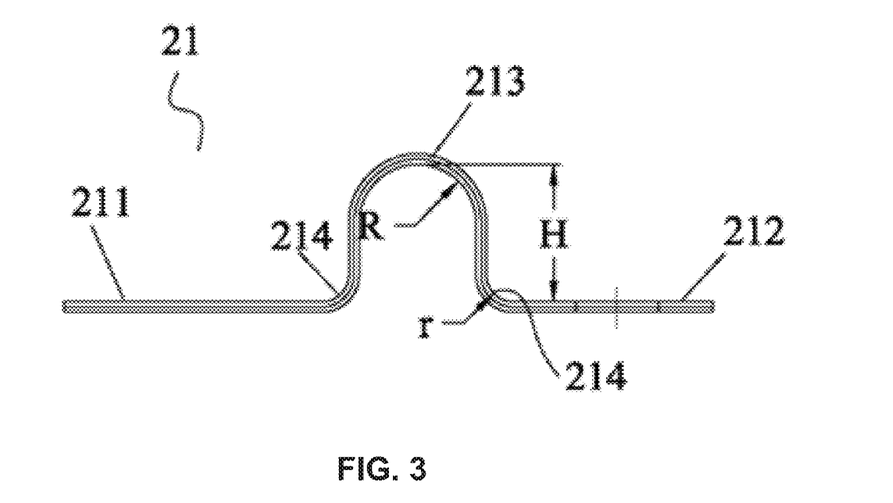
FIG. 3 is a cross-sectional view of the first connecting piece shown in FIG. 2 along an A-A direction.

The buffer section 213 may be located at a center of the first connecting piece 21, so as to buffer a relative movement between the battery modules caused by an external impact, and avoid affecting the connection between the battery modules. Therefore, an anti-vibration ability of the battery modules is improved. A cross-sectional profile of the buffer section 213 is a substantially inverted U shape. FIG. 3 is a cross-sectional view of the first connecting piece shown in FIG. 2 along an A-A direction. A top of the buffer section 213 may be in the form of an arc, and a radius R of the arc may be 20%-80% of a height H of the buffer section 213, which may conveniently absorb the impact to the battery modules caused by the vibration. The buffer section 213 may be formed by stamping the center of the first connecting piece 21.

The buffer section 213 is connected to the output end connecting section 211 and the clamped section 212 via transition arcs 214 respectively. Each of the transition arcs has a radius r, the radius r may be 10%-50% of the radius R of the buffer section 213, which may not only eliminate a shear force perpendicular to the electrically-connected part of the first connecting piece 21 and the second connecting piece 22 applied by the clamping unit during the vibration, but also increase a buffering ability of the first connecting piece 21 and the second connecting piece 22. Meanwhile, compared with a right angle transition, the current density at the transition arc 214 is low, which may be advantageous for the conduction during high-current charging and discharging.

The first connecting piece 21 and the second connecting piece 22 may be made of various metals with high conductivity, such as silver, high purity copper, or high purity aluminum, preferably, soft high purity copper or high purity aluminum with high flexibility.

Preferably, each of the first connecting piece 21 and the second connecting piece 22 is formed by a plurality of superposed metal sheets, and the thickness of a single metal sheet is 0.01-0.5 mm, more preferably 0.03-0.2 mm, so that the strength and the flexibility of the first connecting piece 21 and the second connecting piece 22 may be increased.

The number of the superposed metal sheets may be determined by the dimension of the output end of the battery module and charging and discharging currents. The plurality of metal sheets may be superposed together in various manners, such as surface coating, bonding, welding, riveting and hot pressing. Preferably, the plurality of metal sheets may be superposed together by hot pressing, however the buffer sections 213 of the metal sheets may not be hot pressed so as to avoid affecting the elasticity thereof. More preferably, before hot pressing, metal coatings such as tin, chromium, nickel or zinc coatings, may be coated onto two ends of the single metal sheet so as to prevent corrosion, however, the buffer section 213 is not coated with the metal coating so as to avoid affecting the elasticity thereof.

The output end connecting section 211 of the first connecting piece 21 may be electrically connected to the output end of the first battery module in various connection manners, such as thermo-compression bonding, laser welding, brazing or friction welding, in which the laser welding and brazing are preferable. A fusion width (shown as the shaded part in FIG. 1) of the output end connecting section 211 of the first connecting piece 21 and the output end of the first battery module is m, and the fusion width m is 30-80% of the length n of the output end 813 of the first battery module. If the fusion width m was too small, the connection strength between the first connecting piece 21 and the output end of the first battery module would be affected. If the fusion width m was too large, the anti-vibration function would be weakened.

Figure 5:
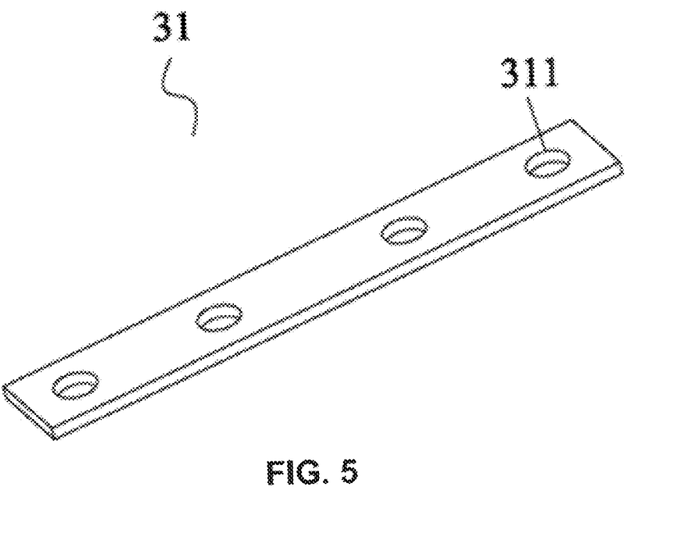
FIG. 5 is a schematic perspective view of an upper clamping plate according to an embodiment of the present disclosure.
Figure 6:
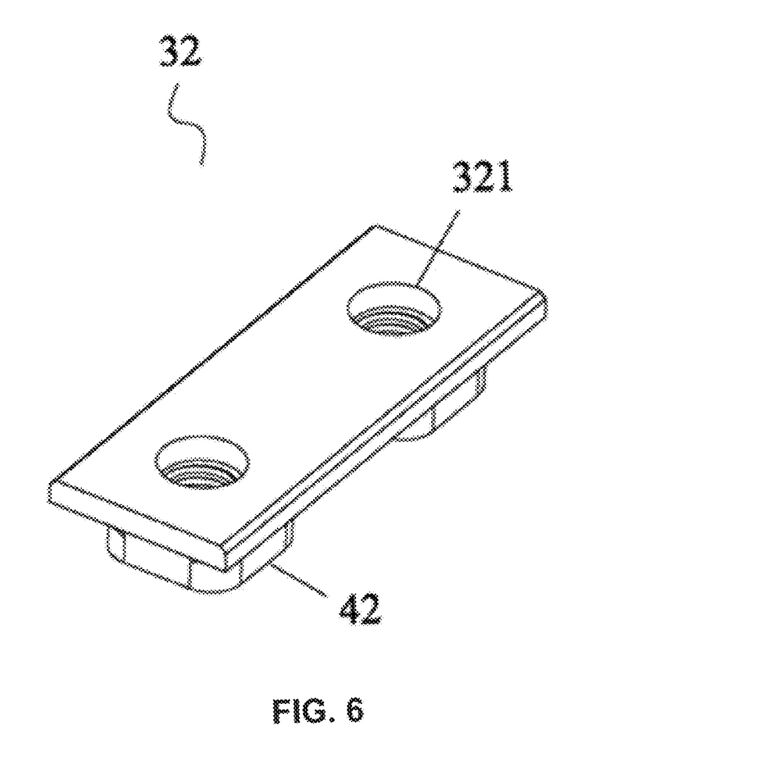
FIG. 6 is a schematic perspective view of a lower clamping plate according to an embodiment of the present disclosure.

As shown in FIG. 5 and FIG. 6, the first connecting piece 21 may be connected to the second connecting piece 22 in various connection manners. In some embodiments of the present disclosure, the clamping unit may clamp the clamped section 212 of the first connecting piece 21 and the clamped section 222 of the second connecting piece 22, so as to form the electrically-connected part of the first connecting piece 21 and the second connecting piece 22.

Specifically, the clamping unit comprises an upper clamping plate 31, a lower clamping plate 32 and a fastener. The clamped section 212 of the first connecting piece 21 and the clamped section 222 of the second connecting piece 22 are clamped between the upper clamping plate 31 and the lower clamping plate 32, and then the upper clamping plate 31 and the lower clamping plate 32 are fastened together by the fastener.

The clamped section 212 of the first connecting piece 21 may have holes 2121 (not shown in FIG. 4), the clamped section 222 of the second connecting piece 22 may have holes 2221 on top of the holes 2121, and accordingly, the upper clamping plate 31 and lower clamping plate 32 may have holes 311 and 321 respectively.

Figure 4:
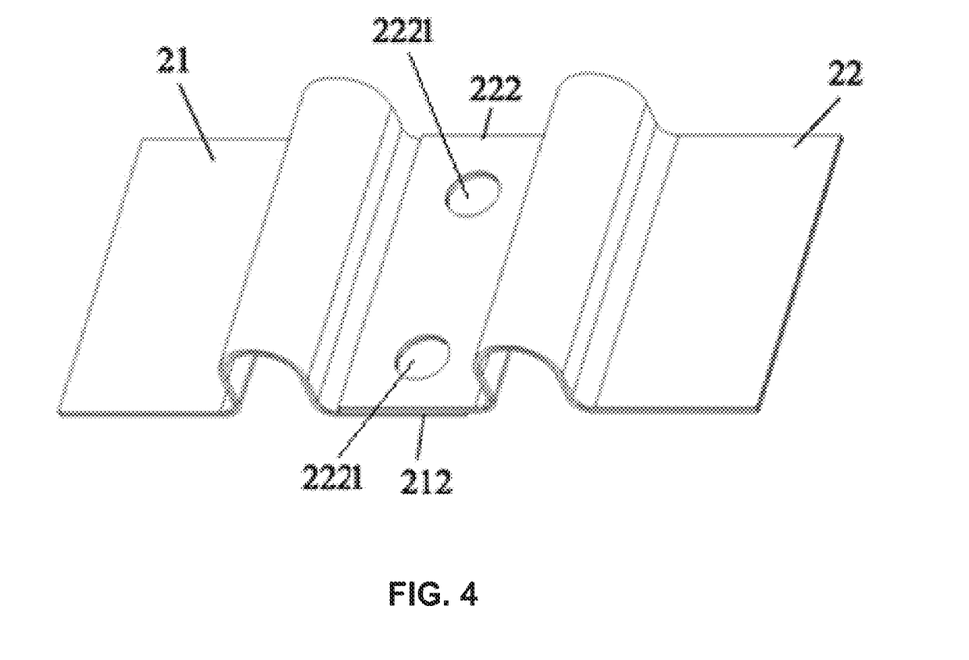
FIG. 4 is a schematic perspective view of overlapped first and second connecting pieces according to an embodiment of the present disclosure.

The clamped section 212 of the first connecting piece 21 and the clamped section 222 of the second connecting piece 22 are overlapped such that the holes 2121 and 2221 are aligned with each other. The overlapped clamped sections 212, 222 are located between the upper clamping plate 31 and the lower clamping plate 32, and the holes 311, 321 and the holes 2121, 2221 are aligned respectively, so as to fasten the clamped section 212 and the clamped section 222 by the fastener passing through the holes 311, 321, 2121, 2221.

The upper clamping plate 31, the lower clamping plate 32 and the fastener may function together to clamp and fasten the first connecting piece 21 and the second connecting piece 22, so that the connection between the first connecting piece 21 and the second connecting piece 22 is more reliable.

In some embodiments, the clamped section 212 of the first connecting piece 21 and the clamped section 222 of the second connecting piece 22 may be welded together by resistance welding before the clamped section 212 and the clamped section 222 are clamped by the upper and lower clamping plates 31, 32, so that the internal resistance of the connector may be decreased.

The materials of the upper and lower clamping plates 31, 32 may be steel, copper, aluminum, magnesium or an alloy thereof, in which the aluminum alloy is preferable.

Figure 8:
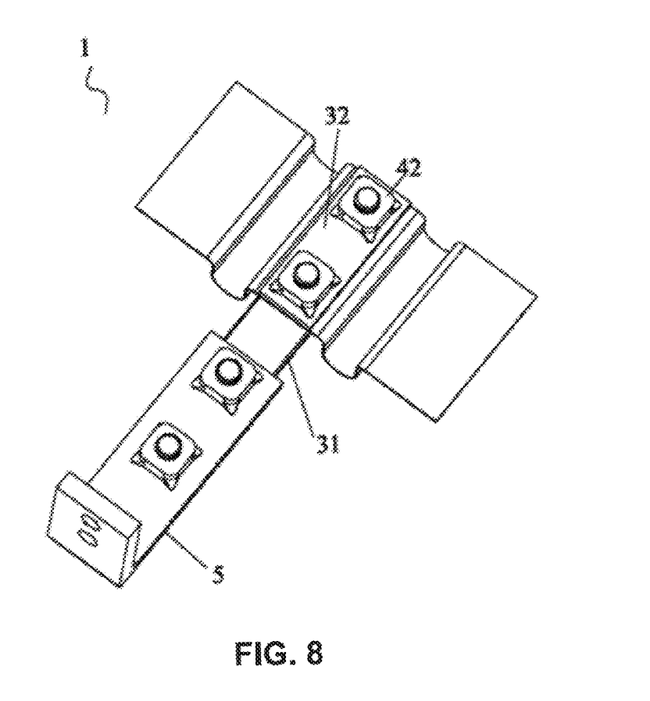
FIG. 8 is a schematic back view of the connector between the battery modules shown in FIG. 7.

The fastener may comprise a screw, and the holes 2121, 2221, 311 and 321 may be threaded holes, and therefore the screw may be meshed within the threaded holes so as to fasten the upper and lower clamping plates 31, 32. Preferably, the fastener comprises a bolt 41 and a nut 42 which function together to fasten the upper clamping plate 31 and the lower clamping plate 32. As shown in FIG. 6 and FIG. 8, the nut 42 may be prefabricated on the lower clamping plate 32. Preferably, the bolt 41 and the nut 42 are made by the same metal materials as those of the upper and lower clamping plates 31, 32, so that the resistance resulted from the connection may be decreased and the conductivity of the connector may be increased.

Figure 7:
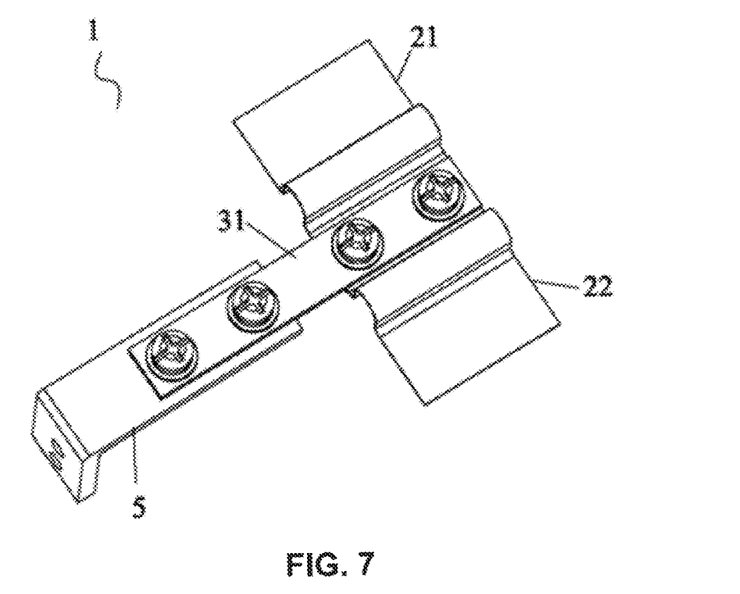
FIG. 7 is a schematic perspective view of a connector between battery modules according to an embodiment of the present disclosure.
Figure 9:
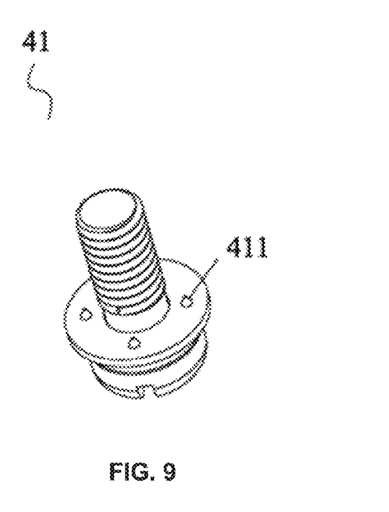
FIG. 9 is a schematic view of a bolt according to an embodiment of the present disclosure.

Furthermore, welding holes 411 are prefabricated in the head of the bolt 41, as shown in FIG. 9. The bolt 41 may be fixed onto the upper clamping plate 31 by welding after the nut 42 and the bolt 41 are meshed (as shown in FIG. 7), so that the welding connection between the bolt 41 and the upper clamping plate 31 can reduce the internal resistance of the connector and improve the conductivity of the connector. The welding may be resistance welding, laser welding or brazing, in which the resistance welding is preferable, which may avoid the leakage of the battery caused by a heat generated during the high frequency welding.

Figure 10:
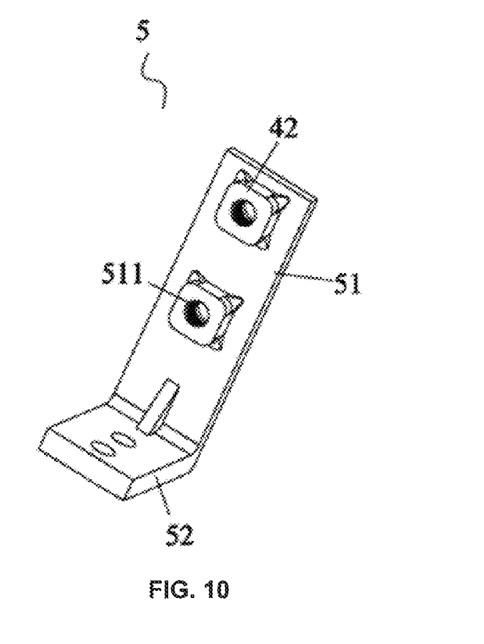
FIG. 10 is a schematic perspective view of a support according to an embodiment of the present disclosure.

As shown in FIG. 10, the support 5 has a substantially L shape, and comprises a clamping plate fixing part 51 and a support part 52 perpendicular to the clamping plate fixing part 51. The clamping plate fixing part 51 may have holes 511. In some embodiments, the upper clamping plate 31 is fixed onto the support 5. Specifically, the holes 311 of the upper clamping plate 31 and the holes 511 of the clamping plate fixing part 51 are aligned, and then the upper clamping plate 31 and the clamping plate fixing part 51 are fastened by the bolt 41 and the nut 42. The nut 42 may be prefabricated on the support 5.

The material of the support 5 may be a light-weight material, such as an aluminum alloy, a magnesium-aluminum alloy or a titanium alloy, in which the aluminum alloy is preferable. Moreover, the surface of the support 5 is subjected to insulation treatment, so as to ensure that the first and second connecting pieces 21, 22 are insulated from external devices respectively. The insulation treatment may be one or more processes selected from anodization, spraying and coating, in which the anodization is preferable.

Figure 11:
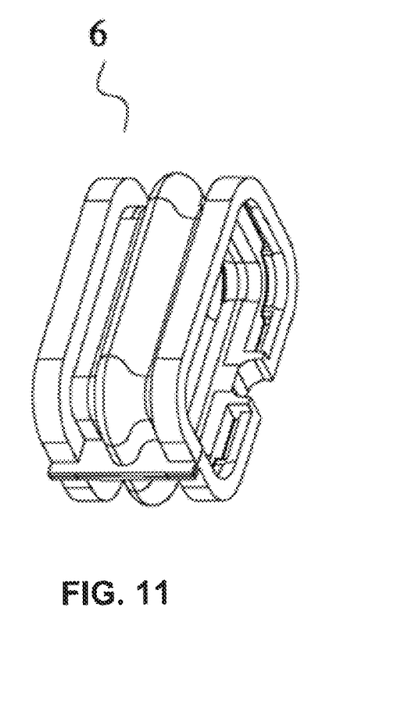
FIG. 11 is a schematic perspective view of an insulation cover according to an embodiment of the present disclosure.
Figure 12:
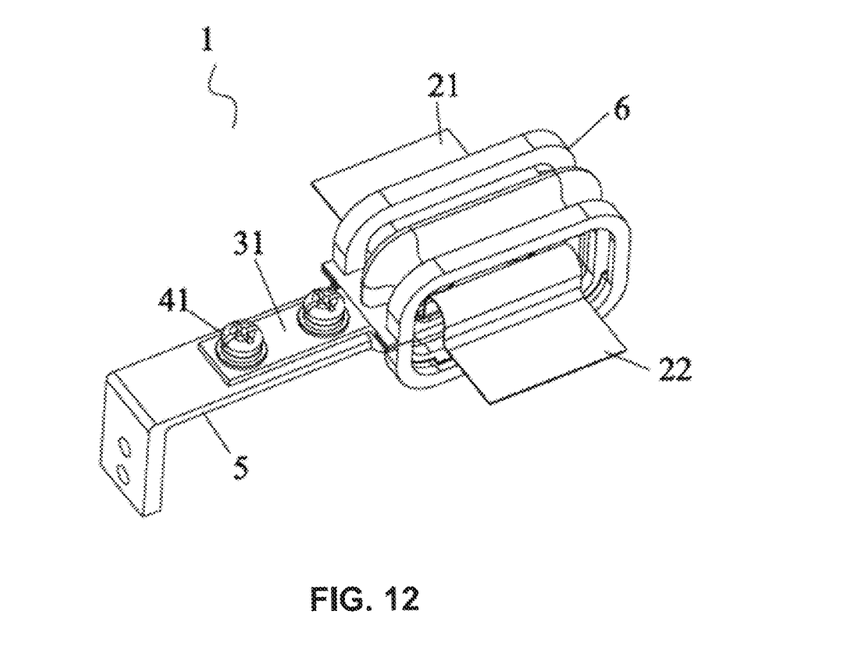
FIG. 12 is a schematic perspective view of a connector between battery modules according to another embodiment of the present disclosure.

As shown in FIG. 11, in order to ensure the insulation reliability between the battery modules, an insulation cover 6 (as shown in FIG. 12) may be disposed over the electrically-connected part of the first connecting piece 21 and the second connecting piece 22, which may insulate the electrically-connected part of the first connecting piece 21 and the second connecting piece 22 from external devices and prevent the battery modules from being short circuited. Therefore, the safety of the battery modules may be improved.

The insulation cover 6 may be made of a material with good insulating property, high flame resistance and good corrosion resistance, such as TPE (thermoplastic elastomer), EPDM (ethylene propylene diene monomer), PPO (polypropylene oxide) or PPS (polypropylene sulfide), in which TPE and EPDM are preferable.

Embodiment 2

As shown in FIG. 1, the battery system 8 according to embodiments of the present disclosure may comprise a plurality of battery modules 81 (only first and second battery modules shown in the FIG. 1) and a plurality of connectors, each connector may be the connector 1 described above. Each of the battery modules may comprise a plurality of cells 811, each of the cells 811 may have a terminal 812, the plurality of cells 811 of each battery module 81 may be connected to each other in series and/or in parallel via the terminals 812 thereof, and each of the battery modules 81 may have an output end 813. The connector 1 connects the adjacent battery modules 81 (e.g., the first and second battery modules).

The cells 811 of the battery modules 81 may be various conventional cells, such as alkaline secondary cells or lithium ion secondary batteries. The manufacture method of the cells 811 is known by those skilled in the art, so that detailed descriptions thereof are omitted here. The number of the cells 811 of the battery modules 81 may be increased or reduced, which depends on the requirements.

The output end 813 of the battery module 81 is used as the terminal 812 of the outermost cell 811 of the battery module 81. In one embodiment, the output end 813 may have a substantially L shape. A first end of the output end 813 extends outwardly from a surface of the cell 811, and then is folded by 90° so as to form the L shape. The folded point of the output end 813 is close to the surface of the cell 811. A second end of the output end 813 is electrically connected to the output end connecting section 211 of the first connecting piece 21 or the output end connecting section of the second connecting piece 22.

The battery system 8 may also comprise a battery tray 82. The battery tray 82 may comprise a plurality of battery module mounting zones 821 and a plurality of connector zones 822. The battery module mounting zones 821 and the connector zones 822 are alternately disposed along a predefined direction. The battery modules 81 are disposed and fixed into the battery module mounting zones 821 respectively, and the connectors are disposed in the connector zones 822 respectively.

The support part 52 of the support 5 is fixed onto the battery tray 82, so that the support 5 can absorb the vibration of the connector 1 and transfer the vibration to the battery tray 82 when the battery is subjected to vibration. The above mentioned configuration can prevent the electrically-connected part of the first connecting piece 21 and the second connecting piece 22 from breaking.

Drawing plates 83 corresponding to adjacent battery module mounting zones 821 respectively are disposed in the connector zones 822, and two ends of the insulation cover 6 are fixed onto the drawing plates 83 respectively. Therefore, the drawing plates 83 can fasten the battery modules 81 by pulling the outermost cells 811 tightly, which can avoid the movement of the battery modules when the vehicle travels.

A process of assembling a plurality of the battery modules 81 into the battery system 8 will be described. Firstly, the first connecting piece 21 and the second connecting piece 22 are welded to the output ends 813 of the adjacent battery modules 81 respectively. Simultaneously, the battery tray 82 is prepared, in which the support 5 and the drawing plates 83 are fixed.

Secondly, the battery modules 81 are placed into the battery module mounting zones 821 of the battery tray 82 respectively.

Thirdly, the clamped section 212 of the first connecting piece 21 and the clamped section 222 of the second connecting piece 22 are overlapped and placed into the connector zone 822 of the battery tray 82, and the clamped section 212 and the clamped section 222 are welded together.

Fourthly, the welded clamped sections 212, 222 are clamped between the upper clamping plate 31 and the lower clamping plate 32, the upper clamping plate 31 and the lower clamping plate 32 are fastened with the fastener, and then the fastener is welded.

Fifthly, the upper clamping plate 31 is fixed onto the support 5.

Finally, the insulation cover 6 is disposed to cover the electrically-connected part of the first connecting piece 21 and the second connecting piece 22, and then two ends of the insulation cover 6 are fixed onto the drawing plates 82 respectively. The battery system 8 according to embodiments of the present disclosure may be assembled.

With the battery system 8 using the connector 1 between battery modules according to embodiments of the present disclosure, the reliability of the connection can be improved. In other words, when the battery system 8 is used in an electric car or other fields, when the battery system 8 is impacted by an external force, because both the first connecting piece 21 and the second connecting piece 22 have the buffer sections having a substantially inverted U shape and the transition arcs 214, the buffering ability is improved, which may increase the connection reliability between the battery modules 81 conveniently. Moreover, the buffer section having a substantially inverted U shape may increase the assembling tolerance, that is, the buffer section having a substantially inverted U shape can offset disadvantages caused by the tolerance of other structures such as the battery thickness.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A connector between battery modules, comprising:
first and second connecting pieces, the first connecting piece being electrically connected to an output end of a first battery module, the second connecting piece being electrically connected to an output end of a second battery module adjacent to the first battery module, and the first connecting piece and the second connecting piece being electrically connected to each other so as to form an electrically-connected part therebetween;
a clamping unit configured to clamp the electrically-connected part formed by the first connecting piece and the second connecting piece; and
a support, the clamping unit being fixed onto the support so as to support the electrically-connected part between the first connecting piece and the second connecting piece;
wherein each of the first and second connecting pieces comprises:
a buffer section having a substantially inverted U shape;
an output end connecting section connected to one end of the buffer section and electrically connected to the output end of a respective battery module; and
a clamped section connected to the other end of the buffer section,
wherein the clamped sections of the first and second connecting pieces are electrically connected to each other.

2. The connector as set forth in claim 1, wherein the clamping unit comprises:
an upper clamping plate;
a lower clamping plate; and
a fastener,
wherein the electrically-connected part is clamped between the upper clamping plate and the lower clamping plate, and the upper clamping plate and the lower clamping plate are fastened together by the fastener.

3. The connector as set forth in claim 2, wherein the fastener comprises a screw.

4. The connector as set forth in claim 1, wherein a top of the buffer section is in the form of an arc, and a radius of the arc is 20%-80% of a height of the buffer section.

5. The connector as set forth in claim 1, wherein the buffer section is connected to the output end connecting section and the clamped section via transition arcs respectively.

6. The connector as set forth in claim 5, wherein each of the transition arcs has a radius that is 10%-50% of the radius of the arc forming the top of the buffer section.

7. The connector as set forth in claim 5, wherein the transition arcs are configured to substantially reduce a shear force on the first and second connecting pieces caused by the clamping unit during vibration.

8. The connector as set forth in claim 1, wherein the clamped sections of the first and second connecting pieces are welded together by resistance welding.

9. The connector as set forth in claim 1, wherein the buffer sections of the first and second connecting pieces are configured to buffer a relative movement between the first and second battery modules.

10. The connector as set forth in claim 1, wherein the buffer sections of the first and second connecting pieces are configured to absorb impacts on the first and second battery modules caused by vibration.

11. The connector as set forth in claim 1, wherein the first connecting piece and/or the second connecting piece are formed by a plurality of superposed metal sheets.

12. The connector as set forth in claim 1, wherein the electrically-connected part of the first connecting piece and the second connecting piece is covered by an insulation cover.

13. A battery system, comprising:
a plurality of battery modules each having a plurality of cells, each of the cells having a terminal, the plurality of cells of each battery module being connected to each other in series and/or in parallel by the terminals thereof, each of the battery modules having an output end; and
a plurality of connectors, each of which being electrically connected to the output ends of adjacent battery modules respectively,
wherein each connector further includes:
first and second connecting pieces, the first connecting piece being electrically connected to an output end of a first battery module, the second connecting piece being electrically connected to an output end of a second battery module adjacent to the first battery module, and the first connecting piece and the second connecting piece being electrically connected to each other so as to form an electrically-connected part therebetween;
a clamping unit configured to clamp the electrically-connected part formed by the first connecting piece and the second connecting piece; and
a support, the clamping unit being fixed onto the support so as to support the electrically-connected part between the first connecting piece and the second connecting piece;
wherein each of the first and second connecting pieces comprises:
a buffer section having a substantially inverted U shape;
an output end connecting section connected to one end of the buffer section and electrically connected to the output end of a respective battery module; and
a clamped section connected to the other end of the buffer section,
wherein the clamped sections of the first and second connecting pieces are electrically connected to each other.

14. The battery system as set forth in claim 13, further comprising a battery tray comprising a plurality of battery module mounting zones and a plurality of connector zones, wherein the battery module mounting zones and the connector zones are alternately disposed along a predefined direction such that the plurality of battery modules are disposed in the plurality of battery module mounting zones respectively, and the plurality of connectors are disposed in the plurality of connector zones respectively.

15. The battery system as set forth in claim 14, wherein the support of each connector comprises a clamping plate fixing part and a support part perpendicular to the clamping plate fixing part, the clamping plate fixing part is connected to the clamping unit, and the support part is fixed onto the battery tray.

16. The battery system as set forth in claim 13, wherein an electrically-connected part of a first connecting piece and a second connecting piece of each connector is covered by an insulation cover.

17. The battery system as set forth in claim 16, wherein drawing plates corresponding to two adjacent battery module mounting zones respectively are disposed in a respective connector zone between the two battery module mounting zones, and two ends of the insulation cover are fixed onto the drawing plates respectively.

18. The battery system as set forth in claim 13, wherein the clamping unit of a respective connector further comprises:
- an upper clamping plate;
- a lower clamping plate; and
- a fastener,
- wherein the electrically-connected part is clamped between the upper clamping plate and the lower clamping plate, and the upper clamping plate and the lower clamping plate are fastened together by the fastener.

* * * * *